(12) United States Patent
Abra et al.

(10) Patent No.: US 12,445,089 B2
(45) Date of Patent: Oct. 14, 2025

(54) PHOTOVOLTAIC MODULE, AND ASSOCIATED KIT, SYSTEM, AND METHOD

(71) Applicant: GAF Energy LLC, Parsippany, NJ (US)

(72) Inventors: Lewis Abra, San Francisco, CA (US); Henry Pham, San Jose, CA (US); Richard Perkins, San Jose, CA (US); Caleb Cheung, San Jose, CA (US); Hasib Amin, Parsippany, NJ (US)

(73) Assignee: GAF Energy LLC, Parsippany, NJ (US)

( * ) Notice: Subject to any disclaimer, the term of this patent is extended or adjusted under 35 U.S.C. 154(b) by 19 days.

(21) Appl. No.: 18/431,511

(22) Filed: Feb. 2, 2024

(65) Prior Publication Data
US 2024/0266998 A1 Aug. 8, 2024

Related U.S. Application Data

(60) Provisional application No. 63/483,136, filed on Feb. 3, 2023.

(51) Int. Cl.
*H02S 40/36* (2014.01)
*H02S 20/23* (2014.01)
*H02S 40/30* (2014.01)

(52) U.S. Cl.
CPC .............. *H02S 40/36* (2014.12); *H02S 20/23* (2014.12); *H02S 40/30* (2014.12)

(58) Field of Classification Search
None
See application file for complete search history.

(56) References Cited

U.S. PATENT DOCUMENTS

| | | | |
|---|---|---|---|
| 1,981,467 | A | 11/1934 | Radtke |
| 3,156,497 | A | 11/1964 | Lessard |
| 3,581,779 | A | 6/1971 | Gilbert, Jr. |
| 4,258,948 | A | 3/1981 | Hoffmann |
| 4,349,220 | A | 9/1982 | Carroll et al. |
| 4,499,702 | A | 2/1985 | Turner |

(Continued)

FOREIGN PATENT DOCUMENTS

| | | |
|---|---|---|
| CA | 2829440 A | 5/2019 |
| CH | 700095 A2 | 6/2010 |

(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Eli S Mekhlin
(74) *Attorney, Agent, or Firm* — GREENBERG TRAURIG, LLP

(57) ABSTRACT

A photovoltaic module, including a base portion and a headlap portion, the base portion having a first layer, and at least one solar cell, the at least one solar cell above the first layer, and the first layer having an edge, headlap portion having a second layer, the second layer having an edge, the headlap portion and the base portion joined to one another along the edge of the first layer and the edge of the second layer.

8 Claims, 2 Drawing Sheets

(56) References Cited

U.S. PATENT DOCUMENTS

| | | |
|---|---|---|
| 4,636,577 A | 1/1987 | Peterpaul |
| 5,167,579 A | 12/1992 | Rotter |
| 5,437,735 A | 8/1995 | Younan et al. |
| 5,590,495 A | 1/1997 | Bressler et al. |
| 5,642,596 A | 7/1997 | Waddington |
| 6,008,450 A | 12/1999 | Ohtsuka et al. |
| 6,033,270 A | 3/2000 | Stuart |
| 6,046,399 A | 4/2000 | Kapner |
| 6,201,180 B1 | 3/2001 | Meyer et al. |
| 6,220,329 B1 | 4/2001 | King et al. |
| 6,308,482 B1 | 10/2001 | Strait |
| 6,320,114 B1 | 11/2001 | Kuechler |
| 6,320,115 B1 | 11/2001 | Kataoka et al. |
| 6,336,304 B1 | 1/2002 | Mimura et al. |
| 6,341,454 B1 | 1/2002 | Koleoglou |
| 6,407,329 B1 | 6/2002 | Iino et al. |
| 6,576,830 B2 | 6/2003 | Nagao et al. |
| 6,928,781 B2 | 8/2005 | Desbois et al. |
| 6,972,367 B2 | 12/2005 | Federspiel et al. |
| 7,138,578 B2 | 11/2006 | Komamine |
| 7,155,870 B2 | 1/2007 | Almy |
| 7,178,295 B2 | 2/2007 | Dinwoodie |
| 7,487,771 B1 | 2/2009 | Eiffert et al. |
| 7,587,864 B2 | 9/2009 | McCaskill et al. |
| 7,678,990 B2 | 3/2010 | McCaskill et al. |
| 7,678,991 B2 | 3/2010 | McCaskill et al. |
| 7,748,191 B2 | 7/2010 | Podirsky |
| 7,819,114 B2 | 10/2010 | Augenbraun et al. |
| 7,824,191 B1 | 11/2010 | Podirsky |
| 7,832,176 B2 | 11/2010 | McCaskill et al. |
| 8,118,109 B1 | 2/2012 | Hacker |
| 8,168,880 B2 | 5/2012 | Jacobs et al. |
| 8,173,889 B2 | 5/2012 | Kalkanoglu et al. |
| 8,210,570 B1 | 7/2012 | Railkar et al. |
| 8,276,329 B2 | 10/2012 | Lenox |
| 8,312,693 B2 | 11/2012 | Cappelli |
| 8,319,093 B2 | 11/2012 | Kalkanoglu et al. |
| 8,333,040 B2 | 12/2012 | Shiao et al. |
| 8,371,076 B2 | 2/2013 | Jones et al. |
| 8,375,653 B2 | 2/2013 | Shiao et al. |
| 8,404,967 B2 | 3/2013 | Kalkanoglu et al. |
| 8,410,349 B2 | 4/2013 | Kalkanoglu et al. |
| 8,418,415 B2 | 4/2013 | Shiao et al. |
| 8,438,796 B2 | 5/2013 | Shiao et al. |
| 8,468,754 B2 | 6/2013 | Railkar et al. |
| 8,468,757 B2 | 6/2013 | Krause et al. |
| 8,505,249 B2 | 8/2013 | Geary |
| 8,512,866 B2 | 8/2013 | Taylor |
| 8,513,517 B2 | 8/2013 | Kalkanoglu et al. |
| 8,586,856 B2 | 11/2013 | Kalkanoglu et al. |
| 8,601,754 B2 | 12/2013 | Jenkins et al. |
| 8,629,578 B2 | 1/2014 | Kurs et al. |
| 8,646,228 B2 | 2/2014 | Jenkins |
| 8,656,657 B2 | 2/2014 | Livsey et al. |
| 8,671,630 B2 | 3/2014 | Lena et al. |
| 8,677,702 B2 | 3/2014 | Jenkins |
| 8,695,289 B2 | 4/2014 | Koch et al. |
| 8,713,858 B1 | 5/2014 | Xie |
| 8,713,860 B2 | 5/2014 | Railkar et al. |
| 8,733,038 B2 | 5/2014 | Kalkanoglu et al. |
| 8,776,455 B2 | 7/2014 | Azoulay |
| 8,789,321 B2 | 7/2014 | Ishida |
| 8,793,940 B2 | 8/2014 | Kalkanoglu et al. |
| 8,793,941 B2 | 8/2014 | Bosler et al. |
| 8,826,607 B2 | 9/2014 | Shiao et al. |
| 8,835,751 B2 | 9/2014 | Kalkanoglu et al. |
| 8,863,451 B2 | 10/2014 | Jenkins et al. |
| 8,898,970 B2 | 12/2014 | Jenkins et al. |
| 8,925,262 B2 | 1/2015 | Railkar et al. |
| 8,943,766 B2 | 2/2015 | Gombarick et al. |
| 8,946,544 B2 | 2/2015 | Jabos et al. |
| 8,950,128 B2 | 2/2015 | Kalkanoglu et al. |
| 8,959,848 B2 | 2/2015 | Jenkins et al. |
| 8,966,838 B2 | 3/2015 | Jenkins |
| 8,966,850 B2 | 3/2015 | Jenkins et al. |
| 8,994,224 B2 | 3/2015 | Mehta et al. |
| 9,032,672 B2 | 5/2015 | Livsey et al. |
| 9,153,950 B2 | 10/2015 | Yamanaka et al. |
| 9,166,087 B2 | 10/2015 | Chihlas et al. |
| 9,169,646 B2 | 10/2015 | Rodrigues et al. |
| 9,170,034 B2 | 10/2015 | Bosler et al. |
| 9,178,465 B2 | 11/2015 | Shiao et al. |
| 9,202,955 B2 | 12/2015 | Livsey et al. |
| 9,212,832 B2 | 12/2015 | Jenkins |
| 9,217,584 B2 | 12/2015 | Kalkanoglu et al. |
| 9,270,221 B2 | 2/2016 | Zhao |
| 9,273,885 B2 | 3/2016 | Rordigues et al. |
| 9,276,141 B2 | 3/2016 | Kalkanoglu et al. |
| 9,331,224 B2 | 5/2016 | Koch et al. |
| 9,356,174 B2 | 5/2016 | Duarte et al. |
| 9,359,014 B1 | 6/2016 | Yang et al. |
| 9,412,890 B1 | 8/2016 | Meyers |
| 9,528,270 B2 | 12/2016 | Jenkins et al. |
| 9,605,432 B1 | 3/2017 | Robbins |
| 9,711,672 B2 | 7/2017 | Wang |
| 9,755,573 B2 | 9/2017 | Livsey et al. |
| 9,786,802 B2 | 10/2017 | Shiao et al. |
| 9,831,818 B2 | 11/2017 | West |
| 9,912,284 B2 | 3/2018 | Svec |
| 9,923,515 B2 | 3/2018 | Rodrigues et al. |
| 9,938,729 B2 | 4/2018 | Coon |
| 9,991,412 B2 | 6/2018 | Gonzalez et al. |
| 9,998,067 B2 | 6/2018 | Kalkanoglu et al. |
| 10,027,273 B2 | 7/2018 | West et al. |
| 10,115,850 B2 | 10/2018 | Rodrigues et al. |
| 10,128,660 B1 | 11/2018 | Apte et al. |
| 10,156,075 B1 | 12/2018 | McDonough |
| 10,187,005 B2 | 1/2019 | Rodrigues et al. |
| 10,256,765 B2 | 4/2019 | Rodrigues et al. |
| 10,284,136 B1 | 5/2019 | Mayfield et al. |
| 10,454,408 B2 | 10/2019 | Livsey et al. |
| 10,530,292 B1 | 1/2020 | Cropper et al. |
| 10,560,048 B2 | 2/2020 | Fisher et al. |
| 10,563,406 B2 | 2/2020 | Kalkanoglu et al. |
| D879,031 S | 3/2020 | Lance et al. |
| 10,579,028 B1 | 3/2020 | Jacob |
| 10,784,813 B2 | 9/2020 | Kalkanoglu et al. |
| D904,289 S | 12/2020 | Lance et al. |
| 11,012,026 B2 | 5/2021 | Kalkanoglu et al. |
| 11,177,639 B1 | 11/2021 | Nguyen et al. |
| 11,217,715 B2 | 1/2022 | Sharenko |
| 11,251,744 B1 | 2/2022 | Bunea et al. |
| 11,258,399 B2 | 2/2022 | Kalkanoglu et al. |
| 11,283,394 B2 | 3/2022 | Perkins et al. |
| 11,309,828 B2 | 4/2022 | Sirski et al. |
| 11,394,344 B2 | 7/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 11,444,569 B2 | 9/2022 | Clemente et al. |
| 11,454,027 B2 | 9/2022 | Kuiper et al. |
| 11,459,757 B2 | 10/2022 | Nguyen et al. |
| 11,486,144 B2 | 11/2022 | Bunea et al. |
| 11,489,482 B2 | 11/2022 | Peterson et al. |
| 11,496,088 B2 | 11/2022 | Sirski et al. |
| 11,508,861 B1 | 11/2022 | Perkins et al. |
| 11,512,480 B1 | 11/2022 | Achor et al. |
| 11,527,665 B2 | 12/2022 | Boitnott |
| 11,545,927 B2 | 1/2023 | Abra et al. |
| 11,545,928 B2 | 1/2023 | Perkins et al. |
| 11,658,470 B2 | 5/2023 | Nguyen et al. |
| 11,661,745 B2 | 5/2023 | Bunea et al. |
| 11,689,149 B2 | 6/2023 | Clemente et al. |
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 2002/0053360 A1 | 5/2002 | Kinoshita et al. |
| 2002/0129849 A1 | 9/2002 | Heckeroth |
| 2003/0101662 A1 | 6/2003 | Ullman |
| 2003/0132265 A1 | 7/2003 | Villela et al. |

(56) References Cited

U.S. PATENT DOCUMENTS

| | | |
|---|---|---|
| 2003/0217768 A1 | 11/2003 | Guha |
| 2004/0000334 A1 | 1/2004 | Ressler |
| 2005/0030187 A1 | 2/2005 | Peress et al. |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2005/0193673 A1 | 9/2005 | Rodrigues et al. |
| 2006/0042683 A1 | 3/2006 | Gangemi |
| 2006/0046084 A1 | 3/2006 | Yang et al. |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2008/0315061 A1 | 12/2008 | Fath |
| 2009/0000222 A1 | 1/2009 | Kalkanoglu et al. |
| 2009/0014057 A1 | 1/2009 | Croft et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2009/0275247 A1 | 11/2009 | Richter et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0325976 A1 | 12/2010 | DeGenfelder et al. |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0100438 A1* | 5/2011 | Gaston ................ C08L 23/12 136/252 |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1 | 10/2011 | Cook et al. |
| 2011/0302859 A1 | 12/2011 | Crasnianski |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1 | 5/2013 | Sherman |
| 2013/0193769 A1 | 8/2013 | Mehta et al. |
| 2013/0247988 A1* | 9/2013 | Reese ................ H10F 19/80 136/259 |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1 | 7/2014 | Beerer et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0162459 A1 | 6/2015 | Lu et al. |
| 2015/0318410 A1* | 11/2015 | Higuma ................ H02S 40/32 136/244 |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0285303 A1 | 9/2016 | Mi |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |
| 2018/0294765 A1 | 10/2018 | Friedrich et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0083619 A1 | 3/2021 | Hegedus |
| 2021/0115223 A1 | 4/2021 | Bonekamp et al. |
| 2021/0159353 A1 | 5/2021 | Li et al. |
| 2021/0301536 A1 | 9/2021 | Baggs et al. |
| 2021/0343886 A1 | 11/2021 | Sharenko et al. |
| 2022/0149213 A1 | 5/2022 | Mensink et al. |
| 2023/0036656 A1 | 2/2023 | Bunea et al. |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| EP | 3772175 A1 | 2/2021 |
| JP | 10046767 A | 2/1998 |
| JP | 2002-106151 A | 4/2002 |
| JP | 2001-098703 A | 10/2002 |
| JP | 2017-027735 A | 2/2017 |
| JP | 2018053707 A | 4/2018 |
| KR | 20090084060 A | 8/2009 |

(56) References Cited

FOREIGN PATENT DOCUMENTS

| KR | 10-1348283 B1 | 1/2014 |
|---|---|---|
| KR | 10-2019-0000367 A | 1/2019 |
| KR | 10-2253483 B1 | 5/2021 |
| NL | 2026856 B1 | 6/2022 |
| WO | 2010/151777 A2 | 12/2010 |
| WO | 2011/049944 A1 | 4/2011 |
| WO | 2015/133632 A1 | 9/2015 |
| WO | 2018/000589 A1 | 1/2018 |
| WO | 2019/201416 A1 | 10/2019 |
| WO | 2020-159358 A1 | 8/2020 |
| WO | 2021-247098 A1 | 12/2021 |
| WO | 2022-051593 A1 | 3/2022 |

OTHER PUBLICATIONS

RGS Energy, 3.5KW Powerhouse 3.0 system installed in an afternoon; Jun. 7, 2019 <<facebook.com/RGSEnergy/>> retrieved Feb. 2, 2021.
Tesla, Solar Roof <<tesla.com/solarroof>> retrieved Feb. 2, 2021.
"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

PHOTOVOLTAIC MODULE, AND ASSOCIATED KIT, SYSTEM, AND METHOD

CROSS-REFERENCE TO RELATED APPLICATION

The application claims priority to U.S. provisional application No. 63/483,136, titled "PHOTOVOLTAIC MODULE, AND ASSOCIATED KIT, SYSTEM, AND METHOD," filed Feb. 3, 2023, the disclosure of which is incorporated by reference herein in its entirety.

FIELD OF THE INVENTION

The present disclosure relates to photovoltaic modules for a roofing deck, and, more particularly, to photovoltaic modules with a base portion and a headlap portion.

DISCUSSION OF THE RELATED ART

Photovoltaic systems having solar panels are commonly installed on roofing structures.

SUMMARY

The Claims, rather than the Summary, define covered embodiments of the present invention. The Summary is a high-level overview of various aspects of the invention, and introduces some of the concepts that are further described in the Detailed Description below. The Summary is not intended to identify key or essential features of the claimed subject matter, and also is not intended to be used in isolation to determine the scope of the claimed subject matter. The claimed subject matter should be understood by reference to appropriate portions of the entire Specification, any or all drawings, and each claim.

In some embodiments, the present invention provides a photovoltaic module, comprising: a base portion, wherein the base portion comprises: a first layer, and at least one solar cell, wherein the at least one solar cell is above the first layer, wherein the first layer has an edge; a headlap portion, wherein the headlap portion comprises a second layer, wherein the second layer has an edge, wherein the headlap portion and the base portion are joined to one another along the edge of the first layer and the edge of the second layer.

In some embodiments, at least one solar cell comprises a plurality of solar cells.

In some embodiments, the headlap portion further comprises at least one electrical jumper assembly, wherein the at least one electrical jumper assembly is configured to electrically connect the photovoltaic module with another photovoltaic module.

In some embodiments, the headlap portion further comprises a controller, wherein the controller is configured to control operation of the at least one solar cell.

In some embodiments, the headlap portion further comprises a communications module, wherein the communications module is configured to communicate data related to at least one of: the at least one solar cell, and a roofing deck.

In some embodiments, the headlap portion further comprises a sensor, wherein the sensor is configured to sense data related to at least one of: the at least one solar cell, and a roofing deck.

In some embodiments, the headlap portion comprises a fire-retardant material.

In some embodiments, the headlap portion further includes a fastener area, wherein the fastener area is configured to receive a fastener to hold the photovoltaic module to a roofing deck.

In some embodiments, the module further comprises a weld seam, wherein the base portion connects with the headlap portion at the weld seam.

In some embodiments, the present invention provides a kit, comprising: a base portion, wherein the base portion comprises: a first layer, and at least one solar cell, wherein the at least one solar cell is above the first layer, wherein the first layer has an edge; and a plurality of headlap portions, wherein the plurality of headlap portions comprises at least a first headlap portion, and a second headlap portion, wherein the first headlap portion comprises at least one electrical jumper assembly, wherein the at least one electrical jumper assembly is configured to electrically connect with another photovoltaic module, wherein the second headlap portion comprises a controller, wherein the controller is configured to control operation of the at least one solar cell, wherein each of the first and second headlap portions comprises a second layer, wherein each second layer has an edge, wherein the edge of each second layer is configured to join to the edge of the first layer.

In some embodiments, the at least one electrical jumper assembly is above the second layer of the first headlap portion.

In some embodiments, the plurality of headlap portions comprises a third headlap portion, wherein the third headlap portion comprises a communications module, wherein the communications module is configured to communicate data related to at least one of: the at least one solar cell, and a roofing deck.

In some embodiments, the plurality of headlap portions comprises a third headlap portion, wherein the third headlap portion comprises a sensor, wherein the sensor is configured to sense data related to at least one of: the at least one solar cell, and a roofing deck.

In some embodiments, at least one of the first headlap portion and the second headlap portion comprises a fire-retardant material.

In some embodiments, first headlap portion includes a fastener area, wherein the fastener area is configured to receive a fastener to hold the first headlap portion to a roofing deck.

In some embodiments, the edge of the first layer and the edges of the second layers are configured to be laminated with one another.

In some embodiments, the edge of the first layer and the edges of the second layers are configured to be fastened with one another.

In some embodiments, the edge of the first layer and the edges of the second layers are configured to be welded with one another.

In some embodiments, edge of the first layer and the edges of the second layers are configured to be adhered with one another.

In some embodiments, the present invention provides a photovoltaic module, comprising: a base portion, wherein the base portion comprises: a first layer, and at least one solar cell, wherein the at least one solar cell is above the first layer, wherein the base portion has: a base portion top edge, a base portion bottom edge, a base portion first side edge, and a base portion second side edge, wherein the base portion bottom edge is opposite the base portion top edge, wherein the base portion first side edge extends between the base portion top edge and the base portion bottom edge, and wherein the base portion second side edge extends between the base portion top edge and the base portion bottom edge and is opposite the base portion first side edge; a headlap portion, wherein the headlap portion comprises: a second layer, wherein the headlap portion has: a headlap portion top edge, a headlap portion bottom edge, a headlap portion first side edge, and a headlap portion second side edge, wherein the headlap portion bottom edge is opposite the headlap portion top edge, wherein the headlap portion first side edge extends between the headlap portion top edge and the headlap portion bottom edge, and wherein the headlap portion second side edge extends between the headlap portion top edge and the headlap portion bottom edge and is opposite the headlap portion first side edge, wherein an entire length of the base portion top edge and an entire length of the headlap portion bottom edge connect with each another.

In some embodiments, the at least one solar cell comprises a plurality of solar cells, wherein the plurality of solar cells are adjacent one another near the base portion bottom edge and between the base portion first side edge and the base portion second side edge.

In some embodiments, the headlap portion further comprises: at least one electrical jumper assembly, wherein the at least one electrical jumper assembly is configured to electrically connect the at least one solar cell with at least one solar cell of another photovoltaic module.

In some embodiments, the headlap portion further comprises: at least one electrical jumper assembly, wherein the at least one electrical jumper assembly is configured to electrically connect the photovoltaic module with another photovoltaic module.

In some embodiments, the headlap portion further comprises: at least one jumper sleeve, wherein the at least one jumper sleeve is above the second layer.

In some embodiments, the headlap portion further comprises: a controller, wherein the controller is configured to control operation of the at least one solar cell.

In some embodiments, the headlap portion further comprises: a communications module, wherein the communications module is configured to communicate data related to at least one of: the at least one solar cell, and a roofing deck.

In some embodiments, the headlap portion further comprises: a sensor, wherein the sensor is configured to sense data related to at least one of: the at least one solar cell, and a roofing deck.

In some embodiments, the headlap portion comprises a fire-retardant material.

In some embodiments, the headlap portion further includes a fastener area, wherein the fastener area is configured to receive a fastener to hold the photovoltaic module to a roofing deck.

In some embodiments, the photovoltaic module further comprises: a weld seam, wherein the base portion connects with the headlap portion at the weld seam, wherein the weld seam extends the entire length of the base portion top edge and the entire length of the headlap portion bottom edge.

In some embodiments, the present invention provides a kit, comprising: a base portion, wherein the base portion comprises: a first layer, and at least one solar cell, wherein the at least one solar cell is above the first layer, wherein the base portion has: a base portion top edge, a base portion bottom edge, a base portion first side edge, and a base portion second side edge, wherein the base portion bottom edge is opposite the base portion top edge, wherein the base portion first side edge extends between the base portion top edge and the base portion bottom edge, and wherein the base portion second side edge extends between the base portion top edge and the base portion bottom edge and is opposite the base portion first side edge; a plurality of headlap portions, wherein the plurality of headlap portions comprises at least: a first headlap portion, and a second headlap portion, wherein each of the first and second headlap portions comprises: a second layer, wherein each of the first and second headlap portions has: a headlap portion top edge, a headlap portion bottom edge, a headlap portion first side edge, and a headlap portion second side edge, wherein the headlap portion bottom edge is opposite the headlap portion top edge, wherein the headlap portion first side edge extends between the headlap portion top edge and the headlap portion bottom edge, and wherein the headlap portion second side edge extends between the headlap portion top edge and the headlap portion bottom edge and is opposite the headlap portion first side edge; and, wherein the headlap portion bottom edge of the first headlap portion and the base portion top edge are connectable with one another, wherein the headlap portion bottom edge of the second headlap portion and the base portion top edge are connectable with one another, wherein the first headlap portion comprises: at least one electrical jumper assembly, wherein the at least one electrical jumper assembly is configured to electrically connect with another photovoltaic module, and wherein the second headlap portion comprises: a controller, wherein the controller is configured to control operation of the at least one solar cell.

In some embodiments, the plurality of headlap portions comprises: a third headlap portion, wherein the third headlap portion comprises: a communications module, wherein the communications module is configured to communicate data related to at least one of: the at least one solar cell, and a roofing deck.

In some embodiments, the plurality of headlap portions comprises: a third headlap portion, wherein the third headlap portion comprises: a sensor, wherein the sensor is configured to sense data related to at least one of: the at least one solar cell, and a roofing deck.

In some embodiments, the bottom edge of the first headlap portion and the top edge of the base portion are configured to be laminated with one another.

In some embodiments, the bottom edge of the first headlap portion and the top edge of the base portion are configured to be fastened with one another.

In some embodiments, the bottom edge of the first headlap portion and the top edge of the base portion are configured to be welded with one another.

In some embodiments, the bottom edge of the first headlap portion and the top edge of the base portion are configured to be adhered with one another.

In some embodiments, the present invention provides a method, comprising: obtaining a base portion, wherein the base portion comprises: a first layer, and at least one solar cell, wherein the at least one solar cell is above the first layer, wherein the base portion has: a base portion top edge, a base portion bottom edge, a base portion first side edge, and a base portion second side edge, wherein the base portion bottom edge is opposite the base portion top edge, wherein the base portion first side edge extends between the base portion top edge and the base portion bottom edge, and wherein the base portion second side edge extends between the base portion top edge and the base portion bottom edge and is opposite the base portion first side edge; obtaining a headlap portion, wherein the headlap portion comprises: a second layer, wherein the headlap portion has: a headlap portion top edge, a headlap portion bottom edge, a headlap portion first side edge, and a headlap portion second side edge, wherein the headlap portion bottom edge is opposite the headlap portion top edge, wherein the headlap portion first side edge extends between the headlap portion top edge and the headlap portion bottom edge, and wherein the headlap portion second side edge extends between the headlap portion top edge and the headlap portion bottom edge and is opposite the headlap portion first side edge; and connecting an entire length of the base portion top edge and an entire length of the headlap portion top edge to one another, thereby to form a photovoltaic module.

In some embodiments, connecting comprises laminating the entire length of the base portion top edge and the entire length of the headlap portion top edge to one another.

In some embodiments, connecting comprises fastening the entire length of the base portion top edge and the entire length of the headlap portion top edge to one another.

In some embodiments, connecting comprises welding the entire length of the base portion top edge and the entire length of the headlap portion top edge to one another.

In some embodiments, connecting comprises adhering the entire length of the base portion top edge and the entire length of the headlap portion top edge to one another.

In some embodiments, connecting comprises welding the top edge of the base portion with the bottom edge of the headlap portion bottom edge, to form a weld seam, wherein the weld seam extends the entire length of the base portion top edge and the entire length of the headlap portion top edge.

In some embodiments, the present invention provides a roofing system, comprising: a roofing deck; and a photovoltaic module installed above the roofing deck, wherein the photovoltaic module comprises: a base portion, wherein the base portion comprises: a first layer, and at least one solar cell, wherein the at least one solar cell is above the first layer, wherein the base portion has: a base portion top edge, a base portion bottom edge, a base portion first side edge, and a base portion second side edge, wherein the base portion bottom edge is opposite the base portion top edge, wherein the base portion first side edge extends between the base portion top edge and the base portion bottom edge, and wherein the base portion second side edge extends between the base portion top edge and the base portion bottom edge and is opposite the base portion first side edge; a headlap portion, wherein the headlap portion comprises: a second layer, wherein the headlap portion has: a headlap portion top edge, a headlap portion bottom edge, a headlap portion first side edge, and a headlap portion second side edge, wherein the headlap portion bottom edge is opposite the headlap portion top edge, wherein the headlap portion first side edge extends between the headlap portion top edge and the headlap portion bottom edge, and wherein the headlap portion second side edge extends between the headlap portion top edge and the headlap portion bottom edge and is opposite the headlap portion first side edge, wherein an entire length of the base portion top edge and an entire length of the headlap portion bottom edge connect with each another.

BRIEF DESCRIPTION OF THE DRAWINGS

This section refers to the drawings that form a part of this disclosure, and which illustrate embodiments of materials and methods described herein.

DETAILED DESCRIPTION

Figure 1:
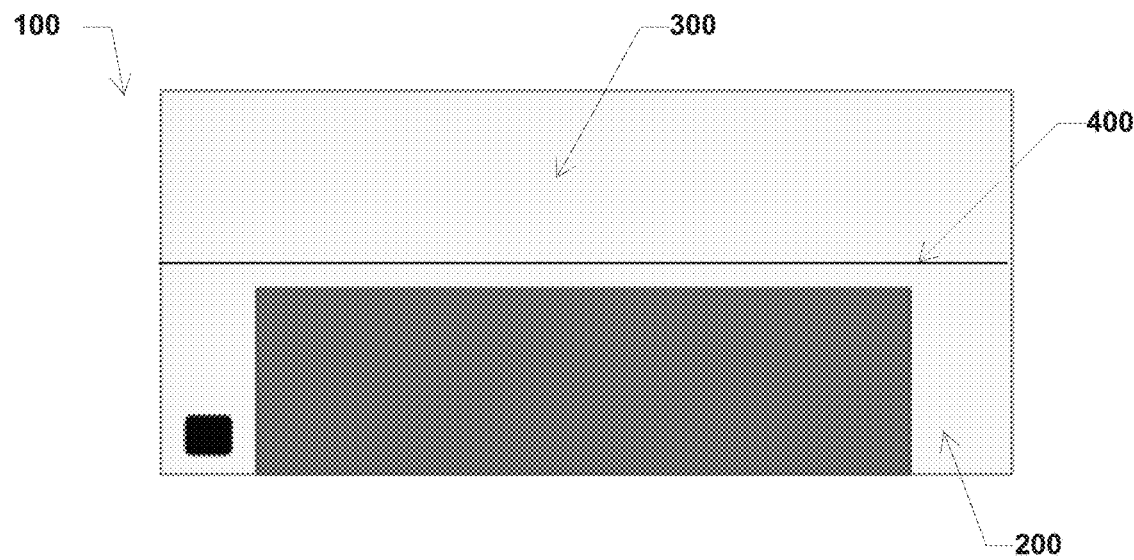
FIG. 1 is an top view of an embodiment of a photovoltaic module, in accordance with some embodiments of the present invention.

In addition to the benefits and improvements that the Specification discloses, other objects and advantages of that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in an embodiment," "in some embodiments," and any similar phrase, as used herein, do not necessarily refer to the same embodiment or embodiments, though the phrases may refer to the same embodiment or embodiments. Furthermore, the phrases "in another embodiment," and any similar phrase, as used herein, do not necessarily refer to a different embodiment, although the phrases may refer to a different embodiment. All embodiments of the disclosure are intended to be combinable without departing from the scope or spirit of the disclosure.

As used herein, terms such as "comprising," "including," "having," and any similar phrase, do not limit the scope of a specific claim to the materials or steps recited by the claim.

As used herein, a "steep slope roof" is a roof that is disposed on a building, such as a house or other residential structure, having a pitch of Y/X, where Y and X are in a ratio of 4:12 to 20:12, where Y corresponds to the "rise" of the roof, and where X corresponds to the "run" of the roof.

In some embodiments, the present invention provides a photovoltaic module with a base portion and a headlap portion, where the base portion and the headlap portion are joinable with one another.

In some embodiments, the present invention provides a photovoltaic module with a base portion and a headlap portion, where the base portion and the headlap portion are connectable with one another.

In some embodiments, the photovoltaic module is installed on a roof. In some embodiments, the photovoltaic module is installed on a steep slope roof. In some embodiments, the photovoltaic module is installed on sloped roof that has a slope less than that of a steep sloped roof.

In some embodiments, the base portion comprises a first layer. In some embodiments, the first layer may be composed of a polymer. In some embodiments, the first layer may be composed of thermoplastic polyolefin (TPO). In some embodiments, the first layer may be composed of polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers such as ethylene tetrafluoroethylene (ETFE), polyvinylidene fluoride (PVDF), tetrafluoroethylene-hexafluoropropylene copolymers (FEP), and/or tetrafluoroethylene-hexafluoropropylene-vinylidene fluoride copolymers (THV), or blends thereof.

In some embodiments, the base portion comprises at least one solar cell, In some embodiments, the at least one solar cell comprises two solar cells. In some embodiments, the at least one solar cell comprises three solar cells. In some embodiments, the at least one solar cell comprises four solar cells. In some embodiments, the at least one solar cell comprises five solar cells. In some embodiments, the at least one solar cell comprises six solar cells. In some embodiments, the at least one solar cell comprises seven solar cells. In some embodiments, the at least one solar cell comprises eight solar cells. In some embodiments, the at least one solar cell comprises more than eight solar cells.

In some embodiments, the at least one solar cell comprises a plurality of groups of solar cells. In some embodiments, each of the plurality of groups of solar cells includes a plurality of solar cells.

In some embodiments, the at least one solar cell is above the first layer. In some embodiments, the at least one solar cell is directly above the first layer—that is, there is no intervening layer between the at least one solar cell and the first layer. In some embodiments, at least one solar cell is not directly above the first layer—that is, there is at least one layer intervening between the at least one solar cell and the first layer. In some embodiments, there is at least two layers intervening between the at least one solar cell and the first layer. In some embodiments, there is at three layers intervening between the at least one solar cell and the first layer. In some embodiments, there are more than three layers intervening between the at least one solar cell and the first layer.

In some embodiments, the at least one solar cell is connected to the first layer. In some embodiments, the at least one solar cell is adhered to the first layer. In some embodiments, the at least one solar cell is laminated to the first layer. In some embodiments, the at least one solar cell is fastened (such as by one or more of a chemical and/or mechanical fastener) to the first layer.

In some embodiments, the base portion includes at least one junction box. In some embodiments, the junction box is electrically connected to at least one electrical bussing of the photovoltaic module. In some embodiments, the junction box is electrically connected to at least one electrical bussing of the photovoltaic module. In some embodiments, the base portion includes two junction boxes. In some embodiments, the base portion includes more than two junction boxes. In some embodiments, the base portion omits the junction box.

In some embodiments, the base portion has a base portion top edge, a base portion bottom edge, a base portion first side edge, and a base portion second side edge, wherein the base portion bottom edge is opposite the base portion top edge, wherein the base portion first side edge extends between the base portion top edge and the base portion bottom edge, and wherein the base portion second side edge extends between the base portion top edge and the base portion bottom edge and is opposite the base portion first side edge.

In some embodiments, the at least one solar cell comprises a plurality of solar cells, and the plurality of solar cells are adjacent one another near the base portion bottom edge and between the base portion first side edge and the base portion second side edge.

In some embodiments, the headlap portion comprises a second layer. In some embodiments, the second layer may be composed of a polymer. In some embodiments, the second layer may be composed of thermoplastic polyolefin (TPO). In some embodiments, the second layer may be composed of polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers such as ethylene tetrafluoroethylene (ETFE), polyvinylidene fluoride (PVDF), tetrafluoroethylene-hexafluoropropylene copolymers (FEP), and/or tetrafluoroethylene-hexafluoropropylene-vinylidene fluoride copolymers (THV), or blends thereof. In some embodiments, a material of the second layer is the same as the material of the first layer. In some embodiments, a material of the second layer is different that the material of the first layer.

In some embodiments, either or both of the base portion and/or the headlap portion has a thickness from 5 mm to 20 mm. In some embodiments, either or both of the base portion and/or the headlap portion has a thickness from 6 mm to 20 mm. In some embodiments, either or both of the base portion and/or the headlap portion has a thickness from 7 mm to 20 mm. In some embodiments, either or both of the base portion and/or the headlap portion has a thickness from 8 mm to 20 mm. In some embodiments, either or both of the base portion and/or the headlap portion has a thickness from 9 mm to 20 mm. In some embodiments, either or both of the base portion and/or the headlap portion has a thickness from 10 mm to 20 mm. In some embodiments, either or both of the base portion and/or the headlap portion has a thickness from 11 mm to 20 mm. In some embodiments, either or both of the base portion and/or the headlap portion has a thickness from 12 mm to 20 mm. In some embodiments, either or both of the base portion and/or the headlap portion has a thickness from 13 mm to 20 mm. In some embodiments, either or both of the base portion and/or the headlap portion has a thickness from 14 mm to 20 mm. In some embodiments, either or both of the base portion and/or the headlap portion has a thickness from 15 mm to 20 mm. In some embodiments, either or both of the base portion and/or the headlap portion has a thickness from 16 mm to 20 mm. In some embodiments, either or both of the base portion and/or the headlap portion has a thickness from 17 mm to 20 mm. In some embodiments, either or both of the base portion and/or the headlap portion has a thickness from 18 mm to 20 mm. In some embodiments, either or both of the base portion and/or the headlap portion has a thickness from 19 mm to 20 mm.

In some embodiments, either or both of the base portion and/or the headlap portion has a thickness from 5 mm to 19 mm. In some embodiments, either or both of the base portion and/or the headlap portion has a thickness from 6 mm to 19 mm. In some embodiments, either or both of the base portion and/or the headlap portion has a thickness from 7 mm to 19 mm. In some embodiments, either or both of the base portion and/or the headlap portion has a thickness from 8 mm to 19 mm. In some embodiments, either or both of the base portion and/or the headlap portion has a thickness from 9 mm to 19 mm. In some embodiments, either or both of the base portion and/or the headlap portion has a thickness from 10 mm to 19 mm. In some embodiments, either or both of the base portion and/or the headlap portion has a thickness from 11 mm to 19 mm. In some embodiments, either or both of the base portion and/or the headlap portion has a thickness from 12 mm to 19 mm. In some embodiments, either or both of the base portion and/or the headlap portion has a thickness from 13 mm to 19 mm. In some embodiments, either or both of the base portion and/or the headlap portion has a thickness from 14 mm to 19 mm. In some embodiments, either or both of the base portion and/or the headlap portion has a thickness from 15 mm to 19 mm. In some embodiments, either or both of the base portion and/or the headlap portion has a thickness from 16 mm to 19 mm. In some embodiments, either or both of the base portion and/or the headlap portion has a thickness from 17 mm to 19 mm. In some embodiments, either or both of the base portion and/or the headlap portion has a thickness from 18 mm to 19 mm.

In some embodiments, either or both of the base portion and/or the headlap portion has a thickness from 5 mm to 18 mm. In some embodiments, either or both of the base portion and/or the headlap portion has a thickness from 6 mm to 18 mm. In some embodiments, either or both of the base portion and/or the headlap portion has a thickness from 7 mm to 18 mm. In some embodiments, either or both of the base portion and/or the headlap portion has a thickness from 8 mm to 18 mm. In some embodiments, either or both of the base portion and/or the headlap portion has a thickness from 9 mm to 18 mm. In some embodiments, either or both of the base portion and/or the headlap portion has a thickness from 10 mm to 18 mm. In some embodiments, either or both of the base portion and/or the headlap portion has a thickness from 11 mm to 18 mm. In some embodiments, either or both of the base portion and/or the headlap portion has a thickness from 12 mm to 18 mm. In some embodiments, either or both of the base portion and/or the headlap portion has a thickness from 13 mm to 18 mm. In some embodiments, either or both of the base portion and/or the headlap portion has a thickness from 14 mm to 18 mm. In some embodiments, either or both of the base portion and/or the headlap portion has a thickness from 15 mm to 18 mm. In some embodiments, either or both of the base portion and/or the headlap portion has a thickness from 16 mm to 18 mm. In some embodiments, either or both of the base portion and/or the headlap portion has a thickness from 17 mm to 18 mm.

In some embodiments, either or both of the base portion and/or the headlap portion has a thickness from 5 mm to 17 mm. In some embodiments, either or both of the base portion and/or the headlap portion has a thickness from 6 mm to 17 mm. In some embodiments, either or both of the base portion and/or the headlap portion has a thickness from 7 mm to 17 mm. In some embodiments, either or both of the base portion and/or the headlap portion has a thickness from 8 mm to 17 mm. In some embodiments, either or both of the base portion and/or the headlap portion has a thickness from 9 mm to 17 mm. In some embodiments, either or both of the base portion and/or the headlap portion has a thickness from 10 mm to 17 mm. In some embodiments, either or both of the base portion and/or the headlap portion has a thickness from 11 mm to 17 mm. In some embodiments, either or both of the base portion and/or the headlap portion has a thickness from 12 mm to 17 mm. In some embodiments, either or both of the base portion and/or the headlap portion has a thickness from 13 mm to 17 mm. In some embodiments, either or both of the base portion and/or the headlap portion has a thickness from 14 mm to 17 mm. In some embodiments, either or both of the base portion and/or the headlap portion has a thickness from 15 mm to 17 mm. In some embodiments, either or both of the base portion and/or the headlap portion has a thickness from 16 mm to 17 mm.

In some embodiments, either or both of the base portion and/or the headlap portion has a thickness from 5 mm to 16 mm. In some embodiments, either or both of the base portion and/or the headlap portion has a thickness from 6 mm to 16 mm. In some embodiments, either or both of the base portion and/or the headlap portion has a thickness from 7 mm to 16 mm. In some embodiments, either or both of the base portion and/or the headlap portion has a thickness from 8 mm to 16 mm. In some embodiments, either or both of the base portion and/or the headlap portion has a thickness from 9 mm to 16 mm. In some embodiments, either or both of the base portion and/or the headlap portion has a thickness from 10 mm to 16 mm. In some embodiments, either or both of the base portion and/or the headlap portion has a thickness from 11 mm to 16 mm. In some embodiments, either or both of the base portion and/or the headlap portion has a thickness from 12 mm to 16 mm. In some embodiments, either or both of the base portion and/or the headlap portion has a thickness from 13 mm to 16 mm. In some embodiments, either or both of the base portion and/or the headlap portion has a thickness from 14 mm to 16 mm. In some embodiments, either or both of the base portion and/or the headlap portion has a thickness from 15 mm to 16 mm.

In some embodiments, either or both of the base portion and/or the headlap portion has a thickness from 5 mm to 15 mm. In some embodiments, either or both of the base portion and/or the headlap portion has a thickness from 6 mm to 15 mm. In some embodiments, either or both of the base portion and/or the headlap portion has a thickness from 7 mm to 15 mm. In some embodiments, either or both of the base portion and/or the headlap portion has a thickness from 8 mm to 15 mm. In some embodiments, either or both of the base portion and/or the headlap portion has a thickness from 9 mm to 15 mm. In some embodiments, either or both of the base portion and/or the headlap portion has a thickness from 10 mm to 15 mm. In some embodiments, either or both of the base portion and/or the headlap portion has a thickness from 11 mm to 15 mm. In some embodiments, either or both of the base portion and/or the headlap portion has a thickness from 12 mm to 15 mm. In some embodiments, either or both of the base portion and/or the headlap portion has a thickness from 13 mm to 15 mm. In some embodiments, either or both of the base portion and/or the headlap portion has a thickness from 14 mm to 15 mm.

In some embodiments, either or both of the base portion and/or the headlap portion has a thickness from 5 mm to 14 mm. In some embodiments, either or both of the base portion and/or the headlap portion has a thickness from 6 mm to 14 mm. In some embodiments, either or both of the base portion and/or the headlap portion has a thickness from 7 mm to 14 mm. In some embodiments, either or both of the base portion and/or the headlap portion has a thickness from 8 mm to 14 mm. In some embodiments, either or both of the base portion and/or the headlap portion has a thickness from 9 mm to 14 mm. In some embodiments, either or both of the base portion and/or the headlap portion has a thickness from 10 mm to 14 mm. In some embodiments, either or both of the base portion and/or the headlap portion has a thickness from 11 mm to 14 mm. In some embodiments, either or both of the base portion and/or the headlap portion has a thickness from 12 mm to 14 mm. In some embodiments, either or both of the base portion and/or the headlap portion has a thickness from 13 mm to 14 mm.

In some embodiments, either or both of the base portion and/or the headlap portion has a thickness from 5 mm to 13 mm. In some embodiments, either or both of the base portion and/or the headlap portion has a thickness from 6 mm to 13 mm. In some embodiments, either or both of the base portion and/or the headlap portion has a thickness from 7 mm to 13 mm. In some embodiments, either or both of the base portion and/or the headlap portion has a thickness from 8 mm to 13 mm. In some embodiments, either or both of the base portion and/or the headlap portion has a thickness from 9 mm to 13 mm. In some embodiments, either or both of the base portion and/or the headlap portion has a thickness from 10 mm to 13 mm. In some embodiments, either or both of the base portion and/or the headlap portion has a thickness from 11 mm to 13 mm. In some embodiments, either or both of the base portion and/or the headlap portion has a thickness from 12 mm to 13 mm.

In some embodiments, either or both of the base portion and/or the headlap portion has a thickness from 5 mm to 12 mm. In some embodiments, either or both of the base portion and/or the headlap portion has a thickness from 6 mm to 12 mm. In some embodiments, either or both of the base portion and/or the headlap portion has a thickness from 7 mm to 12 mm. In some embodiments, either or both of the base portion and/or the headlap portion has a thickness from 8 mm to 12 mm. In some embodiments, either or both of the base portion and/or the headlap portion has a thickness from 9 mm to 12 mm. In some embodiments, either or both of the base portion and/or the headlap portion has a thickness from 10 mm to 12 mm. In some embodiments, either or both of the base portion and/or the headlap portion has a thickness from 11 mm to 12 mm.

In some embodiments, either or both of the base portion and/or the headlap portion has a thickness from 5 mm to 11 mm. In some embodiments, either or both of the base portion and/or the headlap portion has a thickness from 6 mm to 11 mm. In some embodiments, either or both of the base portion and/or the headlap portion has a thickness from 7 mm to 11 mm. In some embodiments, either or both of the base portion and/or the headlap portion has a thickness from 8 mm to 11 mm. In some embodiments, either or both of the base portion and/or the headlap portion has a thickness from 9 mm to 11 mm. In some embodiments, either or both of the base portion and/or the headlap portion has a thickness from 10 mm to 11 mm.

In some embodiments, either or both of the base portion and/or the headlap portion has a thickness from 5 mm to 10 mm. In some embodiments, either or both of the base portion and/or the headlap portion has a thickness from 6 mm to 10 mm. In some embodiments, either or both of the base portion and/or the headlap portion has a thickness from 7 mm to 10 mm. In some embodiments, either or both of the base portion and/or the headlap portion has a thickness from 8 mm to 10 mm. In some embodiments, either or both of the base portion and/or the headlap portion has a thickness from 9 mm to 10 mm.

In some embodiments, either or both of the base portion and/or the headlap portion has a thickness from 5 mm to 9 mm. In some embodiments, either or both of the base portion and/or the headlap portion has a thickness from 6 mm to 9 mm. In some embodiments, either or both of the base portion and/or the headlap portion has a thickness from 7 mm to 9 mm. In some embodiments, either or both of the base portion and/or the headlap portion has a thickness from 8 mm to 9 mm.

In some embodiments, either or both of the base portion and/or the headlap portion has a thickness from 5 mm to 8 mm. In some embodiments, either or both of the base portion and/or the headlap portion has a thickness from 6 mm to 8 mm. In some embodiments, either or both of the base portion and/or the headlap portion has a thickness from 7 mm to 8 mm. In some embodiments, either or both of the base portion and/or the headlap portion has a thickness from 5 mm to 7 mm. In some embodiments, either or both of the base portion and/or the headlap portion has a thickness from 6 mm to 7 mm. In some embodiments, either or both of the base portion and/or the headlap portion has a thickness from 5 mm to 6 mm.

In some embodiments, the thickness of the base portion is the same as the thickness of the headlap portion. In some embodiments, the thickness of the base portion is different than the thickness of the headlap portion.

In some embodiments, the headlap portion has a headlap portion top edge, a headlap portion bottom edge, a headlap portion first side edge, and a headlap portion second side edge, wherein the headlap portion bottom edge is opposite the headlap portion top edge, where the headlap portion first side edge extends between the headlap portion top edge and the headlap portion bottom edge, and where the headlap portion second side edge extends between the headlap portion top edge and the headlap portion bottom edge and is opposite the headlap portion first side edge.

In some embodiments, the base portion top edge and the headlap portion bottom edge connect with each another. In some embodiments, an entire length of the base portion top edge and an entire length of the headlap portion bottom edge connect with each another. In some embodiments, less than the entire length of the base portion top edge and the entire length of the headlap portion bottom edge connect with each another. In some embodiments, the entire length of the base portion top edge is connected to less than the entire length of the headlap portion bottom edge. In some embodiments, less than the entire length of the base portion top edge is connected to the entire length of the headlap portion bottom edge.

In some embodiments, the photovoltaic module may have a structure, function, composition and/or components in one or more embodiments discloses in U.S. Pat. No. 11,404,997, titled "Photovoltaic Shingles and Methods of Installing Same," issued Aug. 2, 2022; U.S. Pat. No. 11,251,744, titled "Photovoltaic Shingles and Methods of Installing Same," issued Feb. 15, 2022; and PCT International Patent Publication No. WO 2022/051593, Application No. PCT/US2021/049017, published Mar. 10, 2022, titled "Building Integrated Photovoltaic System," all of the foregoing owned by GAF Energy LLC, and the disclosures of each of the foregoing patent properties are incorporated by reference herein in their entireties.

In some embodiments, the headlap portion further comprises at least one electrical jumper assembly. In some embodiments, the at least one electrical jumper assembly is configured to electrically connect the at least one solar cell with at least one solar cell of another photovoltaic module. In some embodiments, the at least one electrical jumper assembly is configured to electrically connect the photovoltaic module with another photovoltaic module. In some embodiments, the electrical jumper assembly may be one or more embodiments of the electrical jumper assembly set forth in U.S. patent application Ser. No. 18/475,891, filed Sep. 27, 2023, titled "JUMPER MODULE WITH SLEEVE," the disclosure of which is incorporated by reference herein in its entirety.

In some embodiments, the headlap portion further comprises at least one jumper sleeve, wherein the at least one jumper sleeve is above the second layer. In some embodiments, the at least one jumper sleeve is above the second layer. In some embodiments, the at least one jumper sleeve is directly above the second layer—that is, there is no intervening layer between the at least one jumper sleeve and the second layer. In some embodiments, at least one jumper sleeve is not directly above the second layer—that is, there is at least one layer intervening between the at least one jumper sleeve and the second layer. In some embodiments, there is at least two layers intervening between the at least one jumper sleeve and the second layer. In some embodiments, there is at least three layers intervening between the at least one jumper sleeve and the second layer. In some embodiments, there are more than three layers intervening between the at least one jumper sleeve and the second layer. In some embodiments, the jumper sleeve may be connected to the headlap portion by a fastener, an adhesive, welding, or laminating. In some embodiments, the jumper sleeve may be one or more embodiments of the jumper sleeve set forth in U.S. patent application Ser. No. 18/475,891, filed Sep. 27, 2023, titled "JUMPER MODULE WITH SLEEVE," the disclosure of which is incorporated by reference herein in its entirety.

In some embodiments, the headlap portion further comprises a controller. In some embodiments, the controller is configured to control operation of the at least one solar cell. In some embodiments, the controller is configured to control operation of an electronic component other than the at least one solar cell. In some embodiments, the controller is configured to control operation of an electronic component other than the at least one solar cell, as well as the at least one solar cell.

In some embodiments, the headlap portion further comprises a communications module. In some embodiments, the communications module is configured to communicate data related to at least one of the at least one solar cell, and a roofing deck. In some embodiments, the communications module is configured to communicate data related to both of the at least one solar cell and the roofing deck. In some embodiments, the communications module is configured to communicate data related to one or more components other than at least one of the at least one solar cell, and/or the roofing deck.

In some embodiments, the headlap portion further comprises a sensor. In some embodiments, the sensor is configured to sense data related to at least one of the at least one solar cell, and a roofing deck. In some embodiments, the sensor is configured to sense data related to both of the at least one solar cell, and the roofing deck. In some embodiments, the sensor is configured to sense data related to something other than the at least one solar cell, and/or the roofing deck.

In some embodiments, either or both of the headlap portion and/or the base portion comprises one or more other components or modules. By way of non-limiting examples, such components may but need not, include one or more of a rapid shut down module or component, embedded power electronics module or component, DC optimizer module or component, microinverter module or component, wireless power transmitter module or component, voltage sensor module or component, current sensor module or component, temperature sensor module or component, humidity sensor module or component, communication hardware sensor module or component, RFID sensor module or component, Wi-Fi sensor module or component, and/or 5G sensor module or component.

In some embodiments, the headlap portion comprises a fire-resistant or fire-retardant material. In some embodiments, the fire-retardant headlap portion includes one or more of, or all of, or none of, a jumper module, an electrical jumper assembly, a jumper sleeve, a controller, a communications module, a sensor, and/or another electronic and/or nonelectronic component.

In some embodiments, the headlap portion is composed of a material that imparts any or all of the following characteristics: increased thermal insulation, increased thermal conductivity, increased mechanical strength (such as, for example, for higher wind resistance), and/or increased infrared (IR) reflectivity. In some embodiments, the headlap portion material may be chosen to provide a photovoltaic module that meets jurisdiction or other standards or requirements.

In some embodiments, wherein the headlap portion further includes a fastener area (i.e., "nail zone"). In some embodiments, the fastener area is configured to receive a fastener to hold the photovoltaic module to the roofing deck. In some embodiments, the fastener area is configured to receive a plurality of fasteners to hold the photovoltaic module to the roofing deck. In some embodiments, the headlap portion omits a fastener area. In some embodiments, the fastener area is configured to receive one or more of any of, or each of, a nail, staple, screw, and/or rivet. Thus, in some embodiments, when the photovoltaics module is installed on a roofing deck, the fastener area receive one or more of any of, or each of, a nail, staple, screw, and/or rivet, thereby to install the photovoltaic module on the roofing deck.

In some embodiments, the fastener area may be on a portion of the headlap portion only, the base portion only, or both the headlap portion as well as the base portion.

As discussed, in some embodiments, the headlap portion is connected with the base portion. In some embodiments, the headlap portion and base portion are connected in a manufacturing facility. In some embodiments, the headlap portion and base portion are connected in a manufacturing facility after formation of the headlap portion and the base portion. In some embodiments, the headlap portion and base portion are connected outside a manufacturing facility. In some embodiments, the headlap portion and base portion are connected at a job site—for example, on the roofing deck, such as prior to installation of the photovoltaic module, the base portion, and/or the headlap portion to the roofing deck; and/or at a location adjacent to the roofing deck.

In some embodiments, the photovoltaic module includes the base portion and the headlap portion that are adhered to one another. In some embodiments, the photovoltaic module includes the base portion and the headlap portion that are laminated to one another. In some embodiments, the photovoltaic module includes the base portion and the headlap portion that are fastened (such as by one or more of a chemical and/or mechanical fastener) to one another. In some embodiments, the photovoltaic module includes the base portion and the headlap portion that are welded (such as by ultrasonic welding, or heat welding, for example) to one another.

In some embodiments, the base portion is welded to the headlap portion, to form a weld seam. In some embodiments, the weld seam extends the entire length of the base portion top edge and the entire length of the headlap portion top edge. In some embodiments, the weld seam extends less than the entire length of the base portion top edge and less than the entire length of the headlap portion top edge.

In some embodiments, a kit includes one or more base portions, and/or one or more headlap portions, which are connectable to one another, but which may or not be connected to one another. In some embodiments, the headlap portion and the base portion are configured to be adhered, laminated, fastened, and/or welded to one another, but may or may not be connected.

Figure 2:
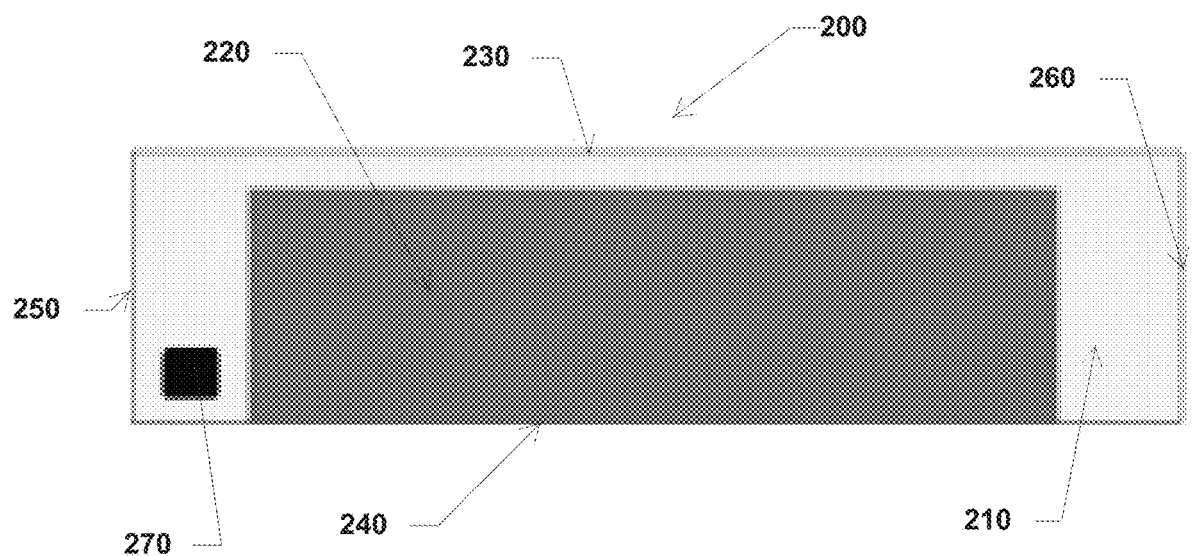
FIG. 2 is a top view of a base portion of a photovoltaic module, in accordance with some embodiments of the invention.
Figure 3:
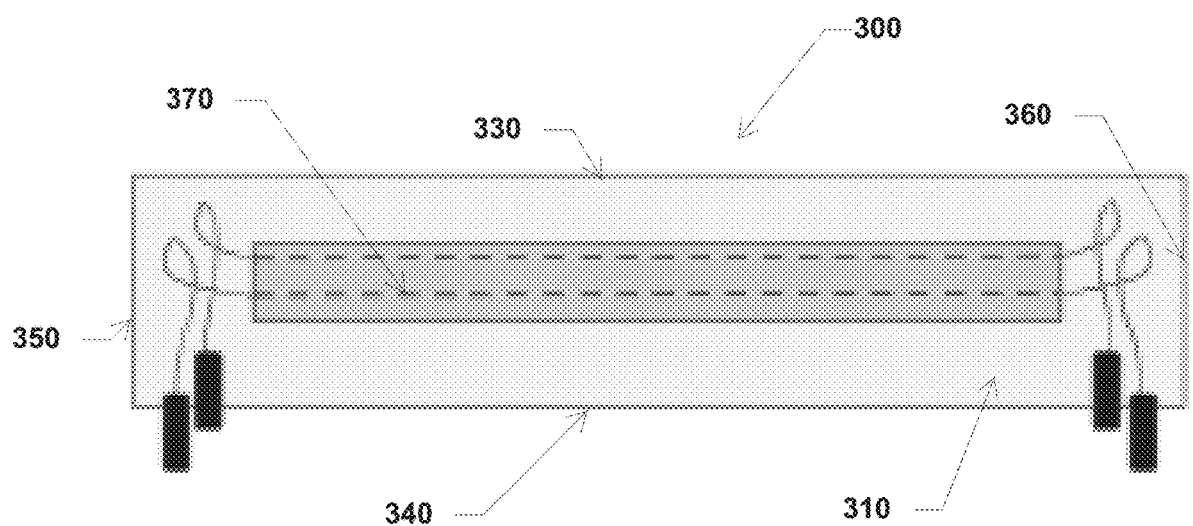
FIG. 3 is a top view of a headlap portion of a photovoltaic module, in accordance with some embodiments of the invention.
Figure 4:
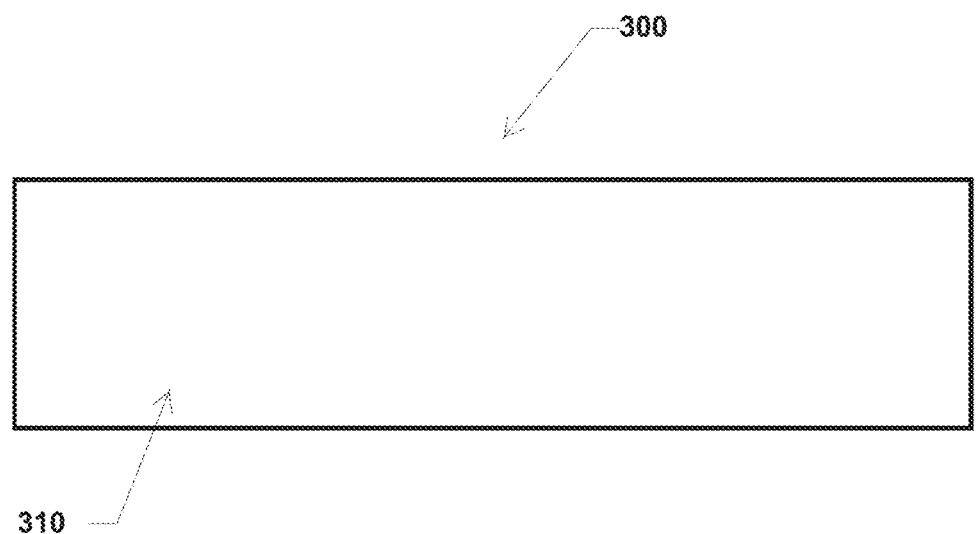
FIG. 4 is a top view of a headlap portion of a photovoltaic module, in accordance with some embodiments of the invention.

FIG. 1 is an top view of an embodiment of a photovoltaic module 100, in accordance with some embodiments of the present invention. As FIG. 1 shows, the photovoltaic module 100 includes a base portion 200 and a headlap portion 300. FIG. 2 is a top view of the base portion 200 of the photovoltaic module 100, in accordance with some embodiments of the invention. FIGS. 3 and 4 are top views of the headlap portion 300 of the photovoltaic module 100, in accordance with some embodiments of the invention. As the figures show, and in accordance with the discussion herein, the base portion 200 may include a first layer 210. In some embodiments, the base portion 200 may include at least one solar cell 220. The at least one solar cell 220 may be above the first layer 210. As discussed, in some embodiments, the at least one solar cell 220 is directly above the first layer 210—that is, there is no intervening layer between the at least one solar cell 220 and the first layer 210. In some embodiments, at least one solar cell 220 is not directly above the first layer 210—that is, there is at least one layer intervening between the at least one solar cell 220 and the first layer 210. In some embodiments, there is at least two layers, at least three layers, or more than three layers intervening between the at least one solar cell 220 and the first layer 210. As discussed, in some embodiments the at least one solar cell 220 may include a plurality of solar cells 220. In some embodiments the at least one solar cell 220 may include a plurality of solar cells 220 adjacent one another. In some embodiments the at least one solar cell 220 may include a plurality of solar cells 220 in one or more rows. In some embodiments the at least one solar cell 220 may include a plurality of solar cells 220 in one row. In some embodiments the at least one solar cell 220 may include a plurality of solar cells 220 in more than one row.

As the drawings show, in some embodiments, the base portion 200 may include a base portion top edge 230, a base portion bottom edge 240, a base portion first side edge 250, and a base portion second side edge 260. The base portion bottom edge 240 may be opposite the base portion top edge 230, the base portion first side edge 250 may extend between the base portion top edge 230 and the base portion bottom edge 240, and the base portion second side edge 260 may extend between the base portion top edge 230 and the base portion bottom edge 240 as well as be opposite the base portion first side edge 250.

As discussed, in some embodiments, as the figures show, the base portion 200 may but need not, include a junction box 270.

As the drawings further show, in some embodiments, the headlap portion 300 may include a second layer 310. In some embodiments, the headlap portion 300 has a headlap portion top edge 330, a headlap portion bottom edge 340, a headlap portion first side edge 350, and a headlap portion second side edge 360. The headlap portion bottom edge 340 may be opposite the headlap portion top edge 330, the headlap portion first side edge 350 may extend between the headlap portion top edge 330 and the headlap portion bottom edge 340, and the headlap portion second side edge 360 may extend between the headlap portion top edge 330 and the headlap portion bottom edge 340, and may be opposite the headlap portion first side edge 350.

As discussed, in some embodiments, the base portion 200 and the headlap portion 300 may be connected to one another, thereby to form the photovoltaic module 100. Also as discussed, in some embodiments, an entire length of the base portion top edge 230 and an entire length of the headlap portion bottom edge 340 may be connected with each another. In some embodiments, less than the entire length of the base portion top edge 230 and/or less than the entire length of the headlap portion bottom edge 340 may be connected with each another.

As shown in FIG. 3, in some embodiments of the present invention, the headlap portion 300 may but need not, include one or more of the components 370 above the second layer 310. For example, FIG. 3 shows component 370 in the form of an electrical jumper assembly, including electrical wires within a jumper sleeve above the second layer 310. As discussed, in some embodiments, the electrical jumper assembly may be configured to electrically connect the at least one solar cell 220 with at least one solar cell of another photovoltaic module (not shown). Also as discussed, in some embodiments, the component 370, whether the electrical jumper assembly and/or jumper sleeve, or another component, may be directly above the second layer 310—that is, there may be no intervening layer between the component 370 and the second layer 310; while in other embodiments, the component 370 may not be directly above the second layer 310—that is, there is at least one layer, at least two layers, at least three layers, or more than three layers, intervening between the component 370 and the second layer 310.

In some embodiments, as discussed, the component 370 may include a controller, and the controller may be configured to control operation of the at least one solar cell, and/or of an electronic component other than the at least one solar cell. In some embodiments. In some embodiments, the component 370 may include a communications module, and the communications module may be configured to communicate data related to at least one of the at least one solar cell, and/or the roofing deck. In some embodiments, the component 370 may include a sensor, and the sensor may be configured to sense data related to at least one of the at least one solar cell, and/or the roofing deck.

As discussed, although not shown in the figures, either or both of the base portion 200 and/or the headlap portion 300 may include a fastener area.

As discussed, the base portion 200 may be connected to the headlap portion 300 by various methods, such as by welding, laminating, adhering, or fastening the portions to one another. In some embodiments, when the base portion 200 is welded to the headlap portion 300, a weld seam 400, as described, may be between the base portion 200 and the headlap portion 300.

FIG. 4 shows an example of the headlap portion 300 that is composed of a fire-resistant or retardant material, as discussed herein. Although the figure shows that headlap portion 300 omits any module or component, this headlap portion may include one or more of any or all of the components and/or modules discussed herein.

In some embodiments of the invention, one of more of the photovoltaic modules 100 may be installed above a roof deck, in a roofing system, as discussed. In some embodiments, one of more of the photovoltaic modules 100 may be installed above the roof deck with components other than the photovoltaic modules 100—for example, with one or more roofing shingles that do not include at least one solar cell. In some embodiments, one of more of the photovoltaic modules 100 may be installed directly on the roof deck—that is, with no intervening layer or component between the roof deck and the photovoltaic modules 100. In some embodiments, one of more of the photovoltaic modules 100 may be installed indirectly on the roof deck—that is, with at least one intervening layer or component, such as but not limited to a roofing underlayment, between the roof deck and the photovoltaic modules 100. In some embodiments, the present invention includes a method, in which one or more of the described components, such as the photovoltaic modules 100, and/or portions of the photovoltaic module 100 such as but not limited to the headlap portion 300 and/or the base portion 200 are obtained. In some embodiments, the invention includes a method of forming the photovoltaic module 100, as described herein. In some embodiments, the invention includes a method of installing the photovoltaic module 100, such as but not limited to on a roof deck, as described.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A photovoltaic module, comprising:
    a base portion,
        wherein the base portion comprises:
            a first layer, and
            at least one solar cell,
                wherein the at least one solar cell is above the first layer,
                wherein the first layer has an edge;
    a headlap portion,
        wherein the headlap portion comprises a second layer,
        wherein the second layer has an edge; and
    a weld seam,
        wherein the headlap portion and the base portion are joined to one another along the edge of the first layer and the edge of the second layer, and
        wherein the base portion connects with the headlap portion at the weld seam.

2. The photovoltaic module of claim 1, wherein the at least one solar cell comprises a plurality of solar cells.

3. The photovoltaic module of claim 1, wherein the headlap portion further comprises at least one electrical jumper assembly, wherein the at least one electrical jumper assembly is configured to electrically connect the photovoltaic module with another photovoltaic module.

4. The photovoltaic module of claim 1, wherein the headlap portion further comprises a controller, wherein the controller is configured to control operation of the at least one solar cell.

5. The photovoltaic module of claim 1, wherein the headlap portion further comprises a communications module, wherein the communications module is configured to communicate data related to at least one of: the at least one solar cell, and a roofing deck.

6. The photovoltaic module of claim 1, wherein the headlap portion further comprises a sensor, wherein the sensor is configured to sense data related to at least one of: the at least one solar cell, and a roofing deck.

7. The photovoltaic module of claim 1, wherein the headlap portion comprises a fire-retardant material.

8. The photovoltaic module of claim 1, wherein the headlap portion further includes a fastener area, wherein the fastener area is configured to receive a fastener to hold the photovoltaic module to a roofing deck.

* * * * *